(12) United States Patent
Motwani et al.

(10) Patent No.: US 7,516,149 B2
(45) Date of Patent: Apr. 7, 2009

(54) ROBUST DETECTOR OF FUZZY DUPLICATES

(75) Inventors: Rajeev Motwani, Palo Alto, CA (US); Surajit Chaudhuri, Redmond, WA (US); Venkatesh Ganti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 10/929,514

(22) Filed: Aug. 30, 2004

(65) Prior Publication Data

US 2006/0053129 A1  Mar. 9, 2006

(51) Int. Cl.
G06F 7/00 (2006.01)
G06F 17/00 (2006.01)

(52) U.S. Cl. .............. 707/102; 707/2; 707/3; 707/7; 707/101; 707/104.1

(58) Field of Classification Search .......... 707/102, 707/1, 2, 3, 7, 101, 104.1
See application file for complete search history.

(56) References Cited

U.S. PATENT DOCUMENTS

| | | | |
|---|---|---|---|
| 5,913,206 A | 6/1999 | Chaudhuri et al. | |
| 5,913,207 A | 6/1999 | Chaudhuri et al. | |
| 5,924,090 A | 7/1999 | Krellenstein | |
| 5,926,813 A | 7/1999 | Chaudhuri et al. | |
| 5,940,821 A | 8/1999 | Wical | |
| 5,950,186 A | 9/1999 | Chaudhuri et al. | |
| 5,960,423 A | 9/1999 | Chaudhuri et al. | |
| 6,169,983 B1 | 1/2001 | Chaudhuri et al. | |
| 6,182,066 B1 | 1/2001 | Marques | |
| 6,223,171 B1 | 4/2001 | Chaudhuri et al. | |
| 6,266,658 B1 | 7/2001 | Adya et al. | |
| 6,356,890 B1 | 3/2002 | Agrawal et al. | |
| 6,356,891 B1 | 3/2002 | Agrawal et al. | |
| 6,363,371 B1 | 3/2002 | Chaudhuri et al. | |
| 6,366,903 B1 | 4/2002 | Agrawal et al. | |
| 6,374,241 B1 | 4/2002 | Lamburt et al. | |
| 6,460,045 B1 | 10/2002 | Aboulnaga et al. | |
| 6,513,029 B1 | 1/2003 | Agrawal et al. | |
| 6,529,901 B1 | 3/2003 | Chaudhuri et al. | |
| 2002/0087550 A1 | 7/2002 | Carlyle et al. | |
| 2002/0099700 A1 | 7/2002 | Li | |
| 2002/0103787 A1 | 8/2002 | Goel et al. | |
| 2003/0022200 A1 | 1/2003 | Vissing et al. | |
| 2003/0154204 A1* | 8/2003 | Chen-Wright et al. | 707/100 |
| 2003/0182276 A1 | 9/2003 | Bossman et al. | |
| 2004/0003005 A1* | 1/2004 | Chaudhuri et al. | 707/200 |
| 2004/0019593 A1* | 1/2004 | Borthwick et al. | 707/4 |

(Continued)

OTHER PUBLICATIONS

Ananthakrishna, Rohit et al., "Eliminating Fuzzy Duplicates in Data Warehouse," Proceeding of the 28th International Conference on Very Large Databases, Aug. 20-23, 2002, Hong Kong, China.*

(Continued)

*Primary Examiner*—John E Breene
*Assistant Examiner*—Hares Jami
(74) *Attorney, Agent, or Firm*—Lee & Hayes, PLLC

(57) ABSTRACT

At least one implementation, described herein, detects fuzzy duplicates and eliminates such duplicates. Fuzzy duplicates are multiple, seemingly distinct tuples (i.e., records) in a database that represent the same real-world entity or phenomenon.

13 Claims, 3 Drawing Sheets

U.S. PATENT DOCUMENTS

| | | | |
|---|---|---|---|
| 2004/0128282 | A1 | 7/2004 | Kleinberger et al. |
| 2004/0139061 | A1 | 7/2004 | Colossi et al. |
| 2005/0027717 | A1* | 2/2005 | Koudas et al. ............. 707/100 |
| 2005/0086263 | A1 | 4/2005 | Ngai et al. |
| 2005/0125401 | A1* | 6/2005 | Carr et al. ..................... 707/5 |
| 2005/0149907 | A1 | 7/2005 | Seitz et al. |
| 2005/0192978 | A1 | 9/2005 | Lightstone et al. |

OTHER PUBLICATIONS

Ananthakrishna, Rohit et al., "Eliminating Fuzzy Duplicates in Data Warehouse," Proceeding of the 28th International Conference on Very Large Databases, Aug. 20-23, 2002, Hong Kong, China. Download: http://delivery.acm.org/10.1145/1290000/1287420/p586-ananthakrishna.pdf?key1=1287420&key2=6012572321&coll=ACM&dl=ACM&CFID=18909444&CFTOKEN=233024.*

Shahri et al., "Data Mining for Removing Fuzzy Duplicates Using Fuzzy Inferece", Fuzzy Information, 2004. Processing NAFIPS '04. IEEE Annual Meeting of the North America, vol. 1, Jun. 27-30, 2004 pp. 419-424 vol. 1 . Download: http://ieeexplore.ieee.org/stamp/stamp.jsp?arnumber=1336319&isnumber=29474.*

Cohen et al., Learning to Match and Cluster Large High-Dimensional Data Sets for Data Integration, Proceedings of the ACM SIGKDD International Conference on Knowledge Discovery and Data Mining, 2002, pp. 475-480.

Ester et al., A density-based algorithm for discovering clusters in large spatial databased with noise, Second International Conference on Knowledge Discovery and Data Mining AAAI Press Menlo Park, CA, US, 1996 pp. 226-331.

Gu et al., Record Linkage: Current Practice and Future Directions, CSIRO Mathematical and Information Sciences-Technical Report, Mar. 1983, Apr. 2003, pp. 1-32.

Elfeky et al., Institute of Electrical and Electronics Engineers: Tailor: a record linkage toolbox, Proceedings ot the 18th International Conference on Data Engineering. (ICDE '2002). San Jose, CA. Feb. 26-Mar. 1, 2002. pp. 17-28.

Monge, Alvaro E. et al., "An efficient domain-independent algorithm for detecting approximately duplicate database records," Proceedings of the ACM SIGMOD Workshop—Data Mining and Knowledge Discovery, May 1997, pp. 23-29.

Monge, Alvaro E. et al., "The Field Matching Problem: Algorithms and Applications," Proceedings / Second Int'l. Conference on Knowledge Discovery & Data Mining, 1996, pp. 267-270.

Chaudhuri, Surajit et al., "Robust and Efficient Fuzzy Match for Online Data Cleaning," Proceedings of the ACM SIGMOD, Jun. 2003, pp. 313-324.

Hernandez, Mauricio A. et al., "The Merge/Purge Problem for Large Databases," Proceedings of the ACM SIGMOD, May 1995, San Jose, CA, pp. 127-138.

Cohen, William W., "Integration of Heterogeneous Databases Without Common Domains Using Queries Based on Textual Similarity," Proceedings of ACM SIGMOD, Jun. 1998, Seattle, WA, pp. 201-212.

Ananthakrishna, Rohit et al., "Eliminating Fuzzy Duplicates in Data Waehouses," Proceedings of the 28th Int'l. Conference on Very Large Databases, 2002, Hong Kong, China.

" A knowledge-based approach for duplicate elimination in data cleaning", Low et al., Information Systems, vol. 26, No. 8, Dec. 2001, pp. 585-606.

"A Foundation for Conventional and Temporal Query Optimization Addressing Duplicates and Ordering", Slivinskas et al., IEEE Transactions on Knowledge and Data Engineering, vol. 13, No. 1, Jan.-Feb. 2001, pp. 21-49.

"Reasoning about Duplicate Elimination with Description Logic", Khizder et al., Computational Logic-CL 2000, vol. 1861, Jul. 24-28, 2000, pp. 1017-1032.

"Customer and household matching: resolving entity identity in data warehouses", Berndt et al., Proceedings of the SPIE, vol. 4057, 2000, pp. 173-180.

"Real-world Data is Dirty: Data Cleansing and The Merge/Purge Problem", Hernandez et al., Data Mining and Knowledge Discovery, vol. 2, No. 1, 1998, pp. 9-37.

"Hashing by Proximity to Process Duplicates in Spatial Databases", Aref et al., Proceedings of Conference on Information and Knowledge Managements, Nov. 28-Dec. 2, 1994, pp. 347-354.

"Sorting, Grouping, and Duplicate Elimination in the Advanced Information Management Prototype", Saake et al., Proceedings of the Fifteenth International Conference on Very Large Data Bases, 1989, pp. 307-316.

"Simplifying Record Linkage: Software and Strategy", Wajda et al., Computers in Biology and Medicine, vol. 17, No. 4, 1987, pp. 239-248.

"Database and Merge/Purge: Select the Proper Service", Schwartz, M., Direct Marketing, vol. 48, No. 3, Jul. 1985, pp. 56,58.

"Duplicate Record Elimination in Large Data Files", Bitton et al., ACM Transactions on Database Systems, vol. 8, No. 2, Jun. 1983, pp. 255-265.

Mathkour, "An Intelligent Tool for Boosting Database Performance", Journal of King Saud University (Computer and Information Sciences), vol. 10, 1998, pp. 81-106.

Qiao, et al., "RHist: Adaptive Summarization over Continuos Data Streams", Proceedings of the Eleventh Int'l. Conference on Information and Knowledge Management, 2002, pp. 469-478.

* cited by examiner

ROBUST DETECTOR OF FUZZY DUPLICATES

TECHNICAL FIELD

This invention generally relates to technology related to databases and data warehouses.

BACKGROUND

Decision support analysis on data warehouses influences important business decisions; therefore, accuracy of such analysis is important. However, data received at the data warehouse from external sources usually contains errors (e.g., spelling mistakes, inconsistent conventions across data sources). These errors often result in duplicate entry of tuples. Hence, significant time and money are spent on data cleaning, the task of detecting and correcting errors in data.

The problem of detection and elimination of duplicated tuples in a database is one of the major problems in the broad area of data cleaning and data quality. It is often the case that the same logical, real-world entity may have multiple representations in the data warehouse.

For example, when a customer named Isabel purchases products from SuperMegaMarket twice, her name might appear as two different records: [Isabel Christie, Seattle, Wash., USA, 98025] and [Christy Isabel, Seattle, Wash., United States, 98025]. The discrepancy may be due to data entry errors and/or preferences of the salesperson who enters the data.

Such duplicated information can significantly increase direct mailing costs because several customers, like Isabel, may receive multiple catalogs. In direct mailing campaigns with tight budget constraints such errors can be the difference between success and failure of the campaign. Moreover, such errors can cause incorrect query results (e.g., How many SuperMegaMarket customers are there in Seattle?) as well as erroneous analysis model creation.

Ridding a database of seemingly distinct, but yet duplicate, entries is the fuzzy duplicate elimination problem. Herein, "fuzzy duplicates" are seemingly distinct tuples (i.e., records) that are not exact matches but yet represent the same real world entity or phenomenon.

This problem is different from the standard exact duplicate elimination problem where two tuples are considered duplicates only when they exactly match all attributes. Unless the context clearly indicates otherwise, assume hereinafter that references to duplicate detection and elimination is focused on the fuzzy duplicate elimination problem.

Previous solutions to fuzzy duplicate elimination can be classified into supervised and unsupervised approaches. Supervised approaches learn rules characterizing pairs of duplicates from training data consisting of known duplicates. Further, these approaches assume that training data exhibit the variety and distribution of errors observed in practice. It is difficult, if not impossible, to obtain such comprehensive training data, an issue that was addressed, to a limited extent, by active learning approaches which have the drawback of requiring interactive manual guidance. In many real data integration scenarios, it is not possible to obtain good training data or interactive user guidance.

The problems of unsupervised duplicate elimination are similar to those of clustering, in that both attempt to partition a dataset into disjoint groups. But, there are some distinct differences between standard clustering formulations and the duplicate elimination problem. These differences will be discussed later.

Current unsupervised approaches tend to ignore these differences and, instead, rely on standard textual similarity functions (e.g., well-known single-linkage clustering algorithms such as edit distance and cosine metric) between multi-attribute tuples and threshold-based constraints for detecting duplicate pairs. However, such threshold-based approaches result in large numbers of false positives (tuples which are not true duplicates but predicted to be so) or large number of false negatives (tuples which truly are duplicates but not recognized as such).

SUMMARY

At least one implementation, described herein, detects fuzzy duplicates and eliminates such duplicates. Fuzzy duplicates are multiple, seemingly distinct tuples (i.e., records) in a database that represent the same real-world entity or phenomenon.

DESCRIPTION OF THE DRAWINGS

The same numbers are used throughout the drawings to reference like elements and features.

DETAILED DESCRIPTION

Figure 1:
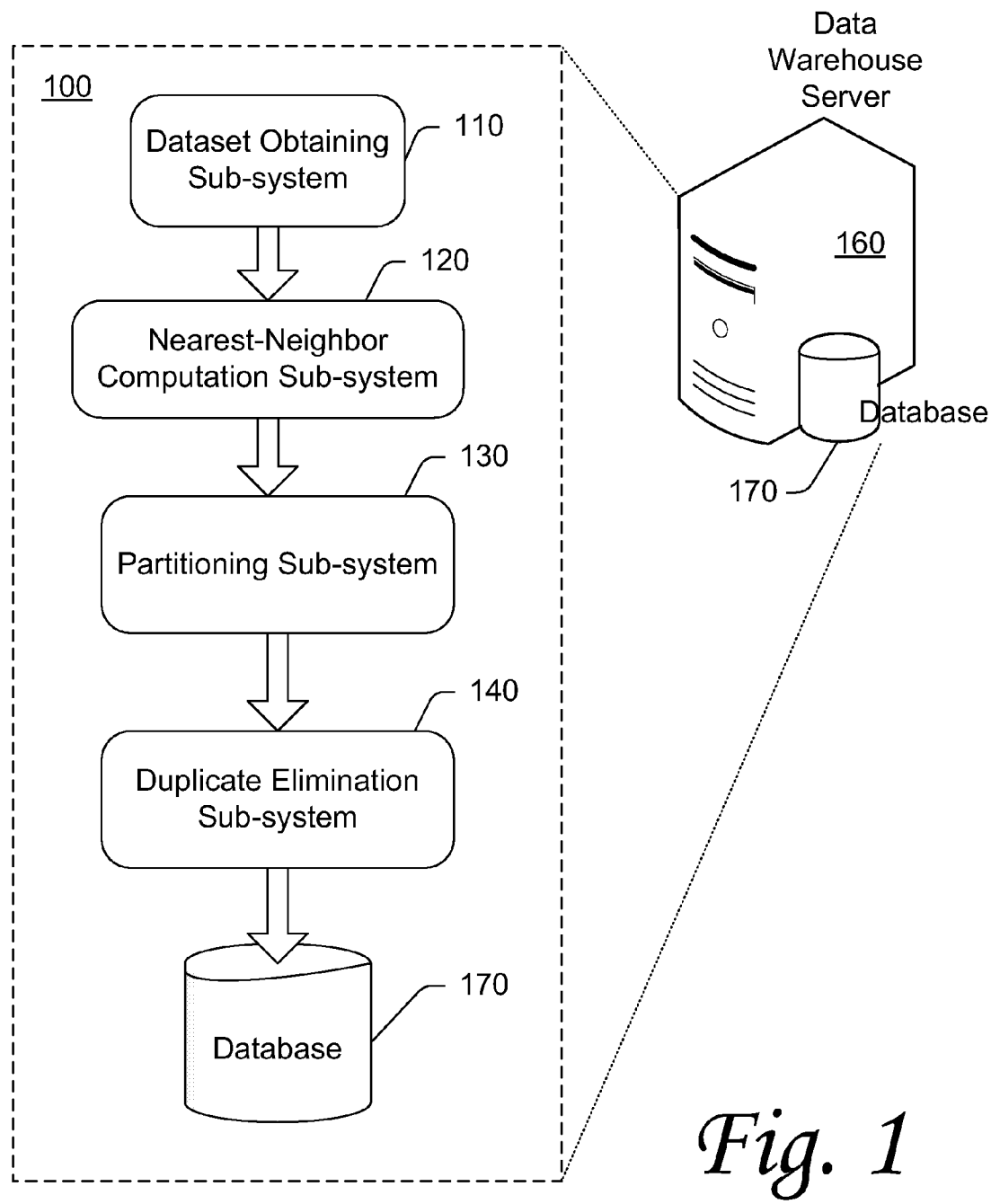
FIG. 1 is a block diagram of an implementation described herein.

The following description sets forth techniques that facilitate the detection and elimination of fuzzy duplicate tuples in a database. The techniques may be implemented in many ways, including (but not limited to) program modules, general- and special-purpose computing systems, dedicated electronics, and as part of one or more computer networks.

An exemplary implementation of these techniques may be referred to as an "exemplary fuzzy duplicate detector" and is described below.

The exemplary fuzzy duplicate detector addresses the fuzzy duplicate elimination problem. Herein, "fuzzy duplicates" are seemingly distinct tuples (i.e., records) that are not exact matches but yet represent the same real world entity or phenomenon nonetheless. Detecting and eliminating fuzzy duplicates is the fuzzy duplicate elimination problem.

Criteria Characterizing Duplicates

In detecting fuzzy duplicates, the exemplary fuzzy duplicate detector utilizes at least two new constraints that conventional approaches do not use. In particular, these two new criteria are called the compact set (CS) and the sparse neighborhood (SN). These criteria explicitly capture local structural properties of the data to characterize groups of duplicate tuples.

The CS and SN criteria capture these properties:

duplicates in a group are "closer" to each other than to others; and the "local neighborhood" of duplicate tuples is empty or sparse.

Tuples that satisfy these criteria may be grouped together as duplicates even though they are far from each other, while tuples that are closer but do not satisfy these criteria may not be grouped together. These localized structural properties differentiate the duplicate elimination problem from standard clustering formulations.

TABLE 1

Examples from a media database. Tuples tagged with asterisks are duplicate tuples.

| ID | ArtistName | TrackName |
|---|---|---|
| 1* | The Doors | LA Woman |
| 2* | Doors | LA Woman |
| 3* | The Beatles | A Little Help from My Friends |
| 4* | Beatles, The | With A Little Help From My Friend |
| 5* | Shania Twain | Im Holding on to Love |
| 6* | Twain, Shania | I'm Holding On To Love |
| 7 | 4th Elemynt | Ears/Eyes |
| 8 | 4th Elemynt | Ears/Eyes - Part II |
| 9 | 4th Elemynt | Ears/Eyes - Part III |
| 10 | $4^{th}$ Elemynt | Ears/Eyes - Part IV |
| 11 | Aaliyah | Are You Ready |
| 12 | AC DC | Are You Ready |
| 13 | Bob Dylan | Are You Ready |
| 14 | Creed | Are You Ready |

Table 1 provides an example of a typical music database. The first six tuples (tagged with an asterisk "*") are duplicate tuples, while the remaining tuples (7-14) are unique.

Compact Set Criterion

The Compact Set (CS) criterion is that a set of duplicates is a compact set of mutual nearest neighbors. The premise behind this criterion is that duplicate tuples are closer to each other than they are to other distinct tuples. That is, duplicate tuples are usually mutually nearest neighbors. For the example in Table 1, tuple 1 is the nearest neighbor of tuple 2 and vice-versa. In contrast, tuple 8 may be the nearest neighbor of tuple 7 and tuple 9 that of tuple 8.

In contrast, conventional threshold-based approaches based on single linkage clustering assumes transitivity (i.e., if 'a' is a duplicate of 'b' and 'b' that of 'c' then 'a' is a duplicate of 'c') and identify connected components in a threshold-graph. Hence, they are more likely to yield a large number of false positives.

Sparse Neighborhood Criterion

The premise behind the sparse neighborhood (SN) criterion is that the local neighborhood of a group of duplicates is sparse. For instance, this criterion is not met around the unique tuples 7-14 in Table 1, which occur in larger (4, for this example) groups than sets of duplicates.

From one perspective, the local neighborhood of a group of tuples is the immediate vicinity defined in terms of a surrounding region of size, dependent on the local distribution of tuples. For example, it may be a sphere of radius $2 \cdot nn(v)$, where $nn(v)$ is the nearest neighbor distance of the tuple v.

If the rate of growth—the number of tuples in the outer sphere—around a tuple is small, its local neighborhood is called "sparse." This notion is extended to a group of tuples, and their joint local neighborhood is called "sparse," if an aggregate of individual growth rates of tuples is small (e.g., less than a threshold c). For instance, the aggregation function max requires that the neighborhood values of all tuples in the group be less than the threshold, whereas the function average only requires the average of all growth rates to be small. The maximum function is more constraining than the average function.

Formalization of the Criteria

In the following definitions, let R be a relation (i.e., dataset) and d: $R \times R \to [0, 1]$ be a symmetric distance function over tuples in R. For clarity of exposition, it is henceforth assumed that (i) the distance between two tuples is zero only if the tuples are exactly identical; and that (ii) no two tuples in R are identical to each other. The validity of this assumption can be ensured by modifying d to return 0 when tuples are exactly identical, and to otherwise return $d(v_1, v_2)+\epsilon$, for some small $\epsilon > 0$.

CS Criterion: A set S of tuples from R is a compact set if, for every tuple v in S, the distance $d(v, v')$ between v and any other tuple v' in S is less than the distance $d(v, v'')$ between v and any other v'' in R-S.

SN Criterion: For a tuple v, consider two concentric spheres: the smaller sphere has a radius $nn(v)$, the distance between v and its nearest neighbor, and the larger sphere a radius of $g(nn(v))(>nn(v))$. Herein, $g(x)=2x$ is used. The neighborhood growth ratio $ng(v)$ is the number of points in the larger sphere around v.

Let AGG: $2^R \to R$ be an aggregation function and c (>0) be a constant. We say that a set of tuples S is an SN(AGG, c) group if (i) $|S|=1$, or (ii) the aggregated value of neighborhood growth ratios of all tuples in S is less than c (i.e., $AGG(\{ng(v): v \text{ in } S\}) < c$).

SG (Small Group) Criterion: Another characteristic of groups of duplicates that may be considered is that they are usually very small. A group G of duplicates is small if $|G| \leq K$, for some pre-defined constant $K > 1$. This may also be called the "small cardinality" criterion since the cardinality (i.e., number of members) of the group is small.

Exemplary Fuzzy Duplicate Detector

Generally, the exemplary fuzzy duplicate detector partitions input relation R (e.g., a dataset of a database) into the minimum number of "valid" groups where a group is valid if it is small and satisfies the CS and SN criteria.

In the context of the exemplary fuzzy duplicate detector, this is the Duplicate Elimination (DE) Problem: Given a relation R, a distance function d, a positive integer K (>1), an aggregation function AGG, and a positive real number c, the exemplary fuzzy duplicate detector partitions R into the minimum number of groups $\{G_1, \ldots, G_m\}$ such that for all $1 \leq i \leq m$:

$|G_i| \leq K$, $G_i$ is a compact set, and $G_i$ is an SN(AGG, c) group.

FIG. 1 illustrates a fuzzy duplicate detection and elimination (FDDE) system 100. The exemplary fuzzy duplicate detector may be implemented by the FDDE system 100, described herein. The components of the FDDE system 100 may be implemented in software, hardware, or in a mixture of both. Generally, the FDDE system 100 determines tuple pairs whose nearest neighbor sets are equal and then extends the pair equality to groups of tuples.

The FDDE system 100 may be part of a server or a client. This FDDE system 100 may be implemented on a general purpose computer, a specific purpose computer, a portable computer, a personal digital assistant (PDA), an appliance, special purpose electronics, or other such computing and electronics equipment that are capable of managing a database.

The components of FDDE system 100 are shown inside the dashed line in FIG. 1. The depicted system 100 includes a Dataset Obtaining sub-system 110, a Nearest-Neighbor Computation sub-system 120, a Partitioning sub-system 130, and a Duplicate Elimination sub-system 140.

The system 100 is coupled (e.g., via a direction connection or via a network, such as the Internet) to a data warehouse server 160. On such server 160, is a database 170. The system 100 and database 170 may reside in the same computing device (such as server 160) or across multiple devices.

With this system 100, the obtainer 110 obtains a dataset from the database 170. This dataset is the subject of the operations of the system 100. This dataset may also be called a "relation" and/or simply "R." Examples of such obtaining include receiving a data packet with a set of tuples, accessing a stored file containing tuples, and/or submitting a query and receiving the results of that query.

The Nearest-Neighbor Computation sub-system 120 determines the K nearest neighbors of every tuple in the obtained relation. The sub-system 120 either generates an index or utilizes an existing index that allows for the efficient answering of the following query: for any given tuple v in R, fetch its K nearest neighbors.

For each tuple in the relation R, the Nearest-Neighbor Computation sub-system 120 determines its nearest K neighbors and its neighborhood growth ratio. The output of this sub-system is a relation NN_Reln[ID, ID1, ..., IDK, NG] where ID1, ..., IDK are the identifiers of the K nearest neighbors of a tuple v with identifier ID and neighbor growth ratio NG. Given an index that can be used for fetching the K nearest neighbors and for computing the neighborhood growth ratio, this sub-system scans the input relation R and, for each tuple v in R, looks up the index and writes the tuple [v, v1, ..., vK, ng(v)] to the output.

The Partitioning sub-system 130 partitions the relation into the minimum number of valid groups of duplicates. In at least one implementation, this sub-system utilizes standard database (e.g., SQL) queries. In this way, the Partitioning sub-system 130 exploits efficient query processing abilities of database systems and avoids moving large amounts of data between a client and a server.

The Partitioning sub-system 130 uses the output of the first phase to partition the input relation into the minimum number of compact SN sets. The resulting partition is the solution to the DE problem.

Based upon the identification of fuzzy duplicates by the Partitioning sub-system, the Duplicate Elimination sub-system 140 cleans the database by removing the superfluous duplicate tuples. This sub-system modifies the database 170 to remove these identified duplicates.

Index Lookup Order

Here, additional details regarding the operation of the Nearest-Neighbor Computation sub-system 120 are discussed. In particular, the order that the index is accessed is the focus here.

The index structures typically used for fetching K nearest neighbors are disk-based. In other words, they access data stored on slower secondary storage systems (like hard disks) rather than data stored in quickly accessible primary memory (e.g., random-access memory).

If consecutive tuples being looked up with commonly used, disk-based, nearest-neighbor indexes are close to each other, then the look-up procedure is likely to access the same portion of the index. Thus, the second lookup benefits from the first lookup. This significantly improves the buffer hit ratio and the overall running time. The exemplary fuzzy duplicate detector utilizes a look-up order that can be implemented efficiently.

Consider the example tuples in Table 1. Suppose the order in which the system looks up the nearest neighbors of tuples in R is 1, 12, 5, etc. In order to fetch the nearest neighbors of tuple 1 ("The Doors, LA Woman"), the indexing procedure would access a portion of the index and, in the process, cache it in the database buffer. A similar lookup for nearest neighbors of tuple 12 ("Aliyah, Are you ready") would access a completely different portion of the index because tuple 12 is very far from tuple 1. Alternatively, if we look up nearest neighbors of tuple 2 ("Doors, LA Woman") after processing tuple 1, the system will use almost the same portion of the index. Consequently, the system can exploit the benefits of it being already in the database buffer.

The exemplary fuzzy duplicate detector adopts a breadth first (BF) order, which satisfies two properties of a good look-up order: First, tuples immediately preceding any tuple in the order must be close to it. Second, the procedure for ordering input tuples has to be efficient.

The order corresponds to a breadth first traversal of a tree T constructed as follows: Any input tuple is selected to be the root of the tree. The children of any node in the tree are its K nearest neighbors, which have not already been inserted into the tree. Note that the exemplary fuzzy duplicate detector does not actually need to build such a tree but just fetch input tuples in the appropriate order.

Each tuple (except the root) in the BF order is always preceded by its siblings or the children of its parent's sibling. These tuples are much closer to each other than arbitrary pairs of tuples. Therefore, all tuples in the lookup order are preceded by tuples that are very close to them. Consequently, the look-up algorithm makes localized index accesses.

For each lookup of an input tuple, its K nearest neighbor tuples are fetched. Therefore, when a tuple is encountered, in the BF order the system would have already fetched it when its parent tuple was looked up. Therefore, the database buffer would already have cached the tuple. The system can either explicitly cache these tuples, memory permitting, or rely on the database system to buffer recent accesses.

Herein, references to nearest neighbor indexes contemplate use of either exact or probabilistic nearest neighbor indexes. Those of ordinary skill in the art are familiar with many conventional indexes that utilize approximation and probabilities based upon standard distance functions (e.g., cosine metric, edit distance, and fuzzy match similarity).

Methodological Implementation

Figure 2:
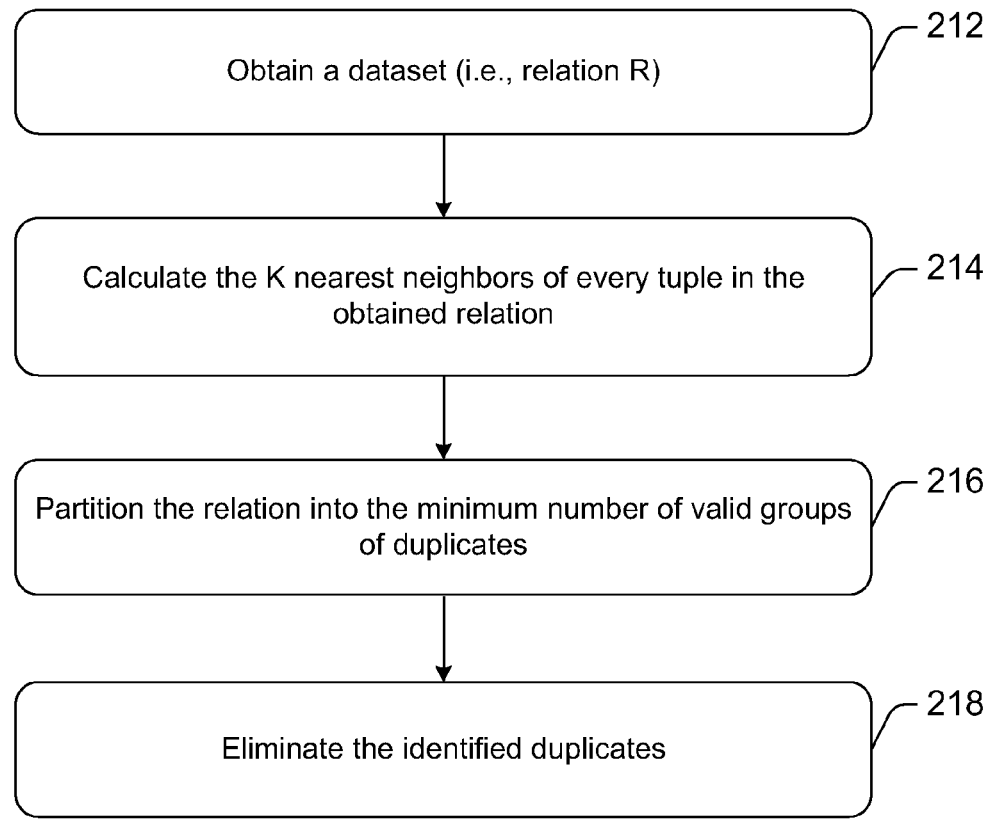
FIG. 2 is a flow diagram showing a methodological implementation described herein.

FIG. 2 shows a methodological implementation of the FDDE system 100. This methodological implementation may be performed in software, hardware, or a combination thereof. For ease of understanding, the method steps are delineated as separate steps; however, these separately delineated steps should not be construed as necessarily order dependent in their performance.

For illustration purposes, the description of this methodological implementation discusses its application to a particular example. In this example, the group {10, 50, 100, 150} forms a compact SN set. It is enough to know, besides the neighborhood growth (NG) values of each tuple, that the 4 nearest neighbor sets of the pairs {10, 50}, {10, 100}, {10, 150} are all equal. It may be deduced from the pair equality and the transitivity of set equality that the group {10, 50, 100, 150} is a compact set.

At 212 of FIG. 2, the FDDE system 100 obtains a dataset (i.e., a relation) from the database 170.

At 214, the FDDE system 100 calculates the K nearest neighbors of every tuple in the obtained relation. To do this, it may utilize an existing index or generate its own.

As part of block 214, the FDDE system 100 computes equality of neighbor sets of varying sizes between tuple pairs. That is, for a tuple pair (10, 100), the system determines whether their 2-nearest neighbor sets, 3-nearest neighbor sets, and so on, through K-nearest neighbor sets, are equal. Such a comparison between tuples v1 and v2 yields the following Boolean results CS2, . . . , CSK, along with their neighbor growth ratios ng(v1) and ng(v2). The value $CS_i$ ($2 \leq i \leq K$) denotes whether the i-neighbor sets of v1 and v2 are equal. The result may be stored in a temporary relation CSPairs.

Still as part of block 214, the FDDE system 100 may issue a database query (e.g., SQL (select into) query) against the output (NN_Reln) of the first phase to compute the CSPairs relation. The query involves a self-join of NN_Reln (e.g., FROM NN_Reln1, NN_Reln2) on the predicate that a tuple NN_Reln1.ID is less than NN_Reln2.ID and that it is in the K-nearest neighbor set of NN_Reln2.ID and vice-versa.

The selected column list has the following two parts: (i) NN_Reln1.ID, NN_Reln2.ID, NN_Reln1.NG, NN_Reln2.NG, and (ii) for each j between 2 and K, a case statement which returns 1 if the set of j-nearest neighbors of NN_Reln1.ID equals the set of j-nearest neighbors of NN_Reln2.ID. Observe that this query may be expressed using standard SQL and perform all of the computation at the database server.

At 216, the FDDE system 100 partitions the relation into the minimum number of valid groups of duplicates. The resulting valid groups of duplicates satisfy each of these criteria:

$|G_i| \leq K$, $G_i$ is a compact set, and $G_i$ is an SN(AGG, c) group.

As part of block 216, the FDDE system 100 extends the equality between neighbor sets of tuple pairs to sets of tuples and determines whether a set of neighbors is compact and satisfies the SN criterion. In Table 2, the 4-neighbor sets of tuple pairs (10, 50), (10, 100), and (10, 150) are equal and, therefore, form a compact set of size 4. The set {10, 50, 100, 150} can be output as a group of duplicates provided, (i) the aggregate SN value of this group is less than the threshold c, and (ii) it cannot be extended to a larger compact SN group. There is no explicit check as to whether or not the 4-neighbor sets of pairs (50, 100), (50, 150), etc. are equal because set equality is transitive.

TABLE 2

Example that illustrates partitioning

| ID: | NN1, NN2, NN3, . . ., NG(TID) |
|---|---|
| 10: | 100, 50, 150, . . ., 2.0 |
| 50: | 10, 150, 100, . . ., 2.0 |
| 100: | 50, 10, 150, . . ., 3.0 |
| 150: | 10, 100, 100, . . ., 2.0 |
| . . . | |

| ID1, ID2: | CS2, CS3, CS4, . . .,NG(ID1), NG(ID2) |
|---|---|
| 10, 50: | 0, 0, 1, . . ., 2.0, 2.0 |
| 10, 100: | 0, 1, 1, . . ., 2.0, 3.0 |
| 10, 150: | 0, 0, 1, . . ., 2.0, 2.0 |
| . . . | |

| ID: | Compact SN Group |
|---|---|
| 10: | 50, 100, 150 |
| . . . | |

The FDDE system 100 processes the CSPairs relation (output of block 214) by issuing the following CS-group query: "select * from CSPairs order by ID" to group all neighbor set comparison results between a tuple v and its neighbors v' where v.ID<v'.ID. Observe that in the result of the CS-group query, each compact SN set G will be grouped together under the tuple with the minimum ID in G.

The FDDE system 100 processes each group Q[ID=v] (identified by the same ID) of tuples in the result of the CS-group query. For a group Q[ID=v] of tuples, if v has not already been identified as belonging to a compact SN set, the system determines the largest non-trivial (of size greater than 1) compact SN set Gv to which v can belong. This set can be identified from just the group Q[ID=v]. The system outputs the set Gv and marks each tuple in Gv to indicate its assignment to a compact set. For example, the set against tuple 10 is {10, 50, 100, 150}. The set {10, 50, 100, 150} is outputted and marks tuple identifiers 10, 50, 100, 150 as belonging to a valid compact SN set so that they are not processed again.

At 218, the FDDE system 100 cleans the database 170 by removing the superfluous duplicate tuples where the identification of these duplicate tuples is based upon the results of block 216.

Other Implementation Details

The solution to the fuzzy duplicate elimination problem offered by the exemplary fuzzy duplicate detector is more accurate and efficient than the existing conventional approaches. It is scale invariant such that the scale of a distance function does impact the local structural properties of tuples. It is split/merge consistent in that shrinking distances between tuples in a group of duplicates and expanding distances between tuples across groups may only change the partition in limited ways. It has a constrained richness such that the range of a duplicate elimination function allows all groupings that would be useful in practice.

In at least one implementation, the user must specify the sparse neighborhood threshold c. However, that calculation may be done automatically or may provide assistance to the user in her calculation of the threshold c.

Exemplary Computing System and Environment

Figure 3:
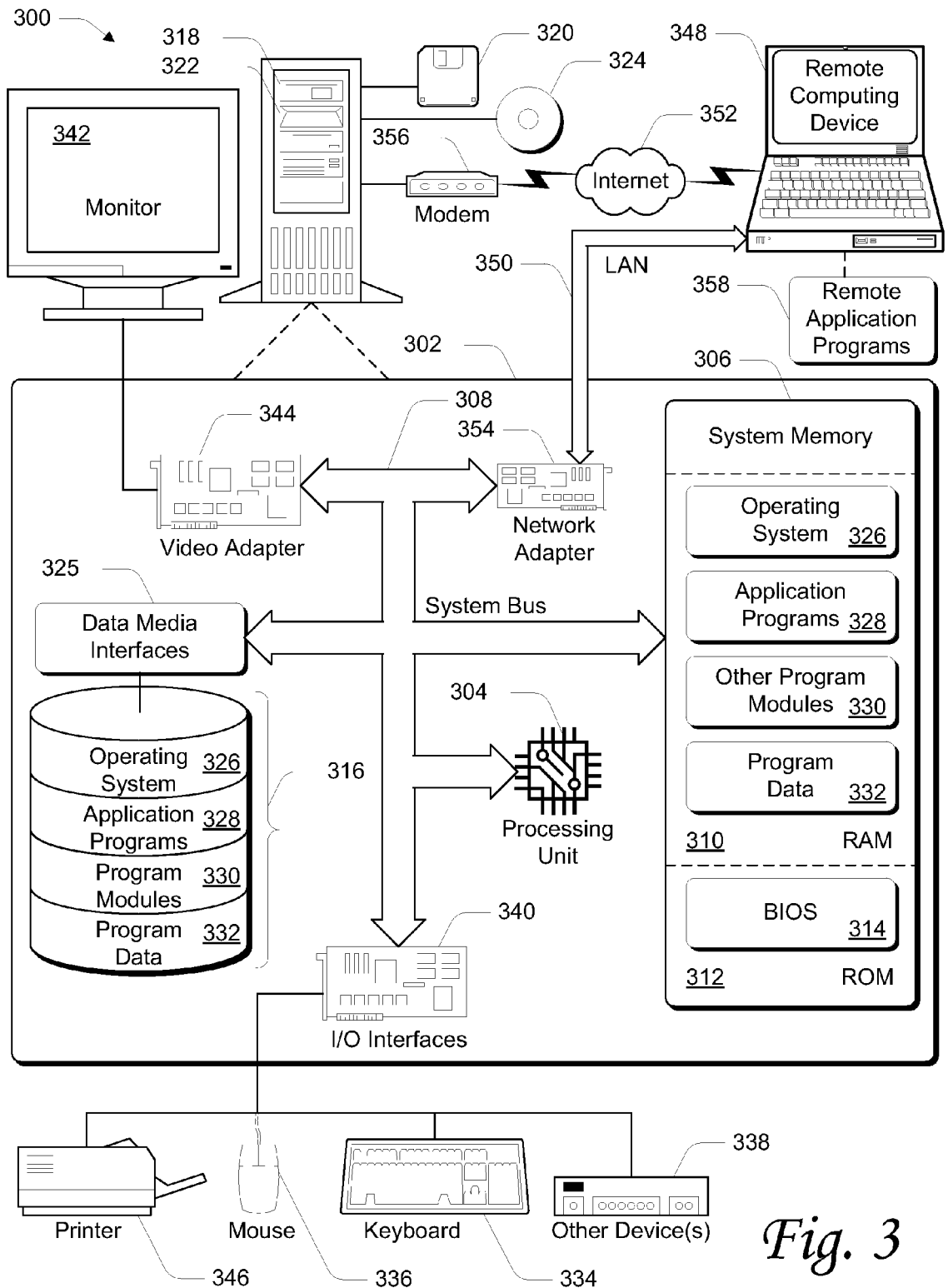
FIG. 3 is an example of a computing operating environment capable of wholly or partially) implementing at least one embodiment described herein.

FIG. 3 illustrates an example of a suitable computing environment 300 within which an exemplary fuzzy duplicate detector, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary fuzzy duplicate detector may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary fuzzy duplicate detector may be described in the general context of processor-executable instructions, such as program modules, being executed by a computer. Generally, program modules include routines, programs, objects, components, data structures, etc. that perform particular tasks or implement particular abstract data types. The exemplary fuzzy duplicate detector may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, but are not limited to, one or more processors or processing units 304, a system memory 306, and a system bus 308 that couples various system components, including the processor 304, to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 302 typically includes a variety of processor-readable media. Such media may be any available media that is accessible by computer 302 and includes both volatile and non-volatile media, removable and non-removable media.

The system memory 306 includes processor-readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 325. Alternatively, the hard disk drive 316, magnetic disk drive 318, and optical disk drive 322 may be connected to the system bus 308 by one or more interfaces (not shown).

The disk drives and their associated processor-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316 magnetic disk 320, optical disk 324, ROM 312, and/or RAM 310, including, by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components, such as speakers (not shown) and a printer 346, which may be connected to computer 302 via the input/output interfaces 340.

Computer 302 may operate in a networked environment using logical connections to one or more remote computers, such as a remote computing device 348. By way of example, the remote computing device 348 may be a personal computer, a portable computer, a server, a router, a network computer, a peer device or other common network node, and the like. The remote computing device 348 is illustrated as a portable computer that may include many or all of the elements and features described herein, relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet. Such networking environments may be wired or wireless.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted, relative to the computer 302 or portions thereof, may be stored in a remote memory storage device. By way of example, remote application programs 358 reside on a memory device of remote computer 348. For purposes of illustration, application programs and other executable program components, such as the operating system, are illustrated herein as discrete blocks, although it is recognized that such programs and components reside at various times in different storage components of the computing device 302, and are executed by the data processor(s) of the computer.

Processor-Executable Instructions

An implementation of an exemplary fuzzy duplicate detector may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary fuzzy duplicate detector may be implemented. Specifically, the exemplary fuzzy duplicate detector(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use of functionality of the exemplary fuzzy duplicate detector(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary fuzzy duplicate detector may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, communication media may comprise, but is not limited to, wired media such as a wired network or direct-wired connection, and wireless media such as acoustic, RF, infrared, and other wireless media. Combinations of any of the above are also included within the scope of processor-readable media.

CONCLUSION

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system to facilitate elimination of fuzzy duplicates which each represent a same real world entity or phenomenon from a dataset R, the system comprising:
    a system memory;
    a processor;
    a dataset obtaining means for obtaining the dataset R comprising multiple tuples from a database, wherein at least some of the tuples are fuzzy duplicates;
    a computing means for identifying tuples of the dataset R which satisfy a compact set criterion that a set of fuzzy duplicates is a compact set of mutual nearest neighbors in the dataset R such that a set S of tuples from the dataset R is a compact set if for every tuple v in S a distance between tuple v and any other tuple v' in S is less than a distance between tuple v and any other tuple v" in R-S wherein the distance is an edit distance and is calculated by any edit distance algorithm, and for identifying tuples of the dataset R which satisfy a sparse neighborhood criterion that a local neighborhood of a set of fuzzy duplicates is sparse, wherein the sparse neighborhood criterion comprises having an aggregated value of neighborhood growth ratios of tuples in S around an individual tuple being less than a growth threshold, wherein the neighborhood growth ratio for an individual tuple is a number of nearest neighbor tuples within a sphere having a radius greater than a distance between every individual tuple in S and its nearest neighbor;
    a partitioning means for partitioning the dataset R into a plurality of groups, wherein each group comprises tuples which are fuzzy duplicates that denote the same real world entity or phenomenon, and wherein each group comprises tuples which satisfy both the compact set criterion to qualify as a compact set and the sparse neighborhood criterion to qualify as a sparse neighborhood; and
    a duplicate-elimination means for eliminating all but one of the fuzzy duplicates from a group so that the one of the fuzzy duplicates which remains in the group will represent the real world entity or phenomenon.

2. A system as recited in claim 1, wherein each group further comprises tuples which are exact duplicates of one another.

3. A system as recited in claim 1, wherein the computing means is for identifying a defined number of nearest neighbor tuples in the dataset, and wherein the distance algorithm is one of cosine metric and fuzzy match similarity.

4. A system as recited in claim 1, wherein the computing means is also for identifying a defined number of nearest neighbor tuples in the dataset and defining a set of defined number of nearest neighbor tuples for each tuple to be a "neighborhood".

5. A system as recited in claim 1, wherein the computing means is also for applying a breadth first order when identifying the one or more nearest neighbor tuples for each of the multiple tuples.

6. A system as recited in claim 1, wherein the partitioning means is for defining multiple partitions of the multiple tuples based upon each partition being a set of mutual nearest neighbors in the dataset and wherein an aggregated value of neighborhood growth ratios of tuples around an individual tuple is less than a growth threshold.

7. A system as recited in claim 1, wherein the partitioning means is for defining multiple partitions of the multiple tuples based upon each partition being a "compact set," a "sparse neighborhood," and a "small cardinality."

8. A method for eliminating fuzzy duplicates which denote a same real world entity or phenomenon from a dataset R, the method implemented at least in part by one or more computing systems, the method comprising:

for each of multiple tuples in the dataset R retrieved from a hardware memory, identifying tuples of the dataset R which satisfy a compact set criterion that a set of fuzzy duplicates is a set of mutual nearest neighbors in the dataset R based on proximity of the tuples to other tuples in a lookup index such that a set S of tuples from dataset R is a compact set if for every tuple v in S a distance between v and any other tuple v' in S is less than a distance between v and any other v" in R-S wherein the distance is an edit distance and is calculated by any edit distance algorithm, and for identifying tuples of the dataset R which satisfy a sparse neighborhood criterion that a local neighborhood of a set of fuzzy duplicates is sparse, wherein the sparse neighborhood criterion comprises having an aggregated value of neighborhood growth ratios of tuples around an individual tuple being less than a growth threshold, wherein the neighborhood growth ratio for an individual tuple is a number of nearest neighbor tuples within a sphere having a radius greater than a distance between every individual tuple in S and its nearest neighbor;

defining multiple partitions of the multiple tuples, wherein each partition comprises tuples which are fuzzy duplicates that denote the same real world entity or phenomenon, and wherein each partition comprises tuples which satisfy both the compact set criterion to qualify as a compact set and the sparse neighborhood criterion to qualify as a sparse neighborhood; and eliminating all but one of the fuzzy duplicates within a partition so that the one of the fuzzy duplicates which remains within the partition will represent the real world entity or phenomenon.

9. The method as recited in claim 8, wherein the computing comprises identifying a defined number of nearest neighbor tuples in the dataset.

10. The method as recited in claim 8, wherein the computing comprises identifying a defined number of nearest neighbor tuples in the dataset and defining a set of defined number of nearest neighbor tuples for each tuple to be a "neighborhood".

11. The method as recited in claim 8, wherein the computing comprises applying a breadth first order when computing the one or more nearest neighbor tuples for each of the multiple tuples.

12. The method as recited in claim 8, wherein the defining comprises delimiting multiple partitions of the multiple tuples based upon each partition being a "compact set" and a "sparse neighborhood."

13. The method as recited in claim 8, wherein the defining comprises delimiting multiple partitions of multiple tuples based upon each partition being a "compact set," a "sparse neighborhood," and a "small cardinality."

* * * * *

UNITED STATES PATENT AND TRADEMARK OFFICE
CERTIFICATE OF CORRECTION

| | | |
|---|---|---|
| PATENT NO. | : 7,516,149 B2 | Page 1 of 1 |
| APPLICATION NO. | : 10/929514 | |
| DATED | : April 7, 2009 | |
| INVENTOR(S) | : Rajeev Motwani et al. | |

It is certified that error appears in the above-identified patent and that said Letters Patent is hereby corrected as shown below:

In column 2, line 20, delete "DESCRIPTION" and insert -- BRIEF DESCRIPTION --, therefor.

Signed and Sealed this

Third Day of May, 2011

David J. Kappos
*Director of the United States Patent and Trademark Office*